(12) United States Patent
Huang et al.

(10) Patent No.: US 12,421,580 B2
(45) Date of Patent: Sep. 23, 2025

(54) PRODUCTION PROCESS OF S355J2 HOT-ROLLED H-BEAM FOR Ce-CONTAINING BEAM-COLUMN MEMBER

(71) Applicant: Wuhai Baogang Wanteng Steel Co., Ltd., Wuhai (CN)

(72) Inventors: Fei Huang, Wuhai (CN); Yanqing Feng, Wuhai (CN); Haiyan Wang, Wuhai (CN); Guochen Wu, Wuhai (CN); Lei Xing, Wuhai (CN); Lei Feng, Wuhai (CN); Jing Lei, Wuhai (CN)

(73) Assignee: Wuhai Baogang Wanteng Steel Co., Ltd., Wuhai (CN)

( * ) Notice: Subject to any disclaimer, the term of this patent is extended or adjusted under 35 U.S.C. 154(b) by 0 days.

(21) Appl. No.: 19/070,773

(22) Filed: Mar. 5, 2025

(65) Prior Publication Data

US 2025/0197978 A1 Jun. 19, 2025

(30) Foreign Application Priority Data

Aug. 23, 2024 (CN) .......................... 202411162596.5

(51) Int. Cl.
*C22C 38/00* (2006.01)
*B22D 11/00* (2006.01)
(Continued)

(52) U.S. Cl.
CPC .......... *C22C 38/005* (2013.01); *B22D 11/001* (2013.01); *B22D 11/16* (2013.01); *C21C 7/06* (2013.01); *C21D 7/13* (2013.01); *C22C 33/06* (2013.01); *C22C 38/002* (2013.01); *C22C 38/02* (2013.01); *C22C 38/04* (2013.01); *C22C 38/12* (2013.01)

(58) Field of Classification Search
None
See application file for complete search history.

(56) References Cited

FOREIGN PATENT DOCUMENTS

| CN | 115141976 A | 10/2022 |
| CN | 118127412 A | * 6/2024 |

OTHER PUBLICATIONS

CNIPA, Notification of First Office Action for Chinese application CN202411162596.5, Sep. 28, 2024.
(Continued)

*Primary Examiner* — Anthony M Liang
(74) *Attorney, Agent, or Firm* — Hemisphere Law, PLLC; Zhigang Ma

(57) ABSTRACT

Provided is a production process of an S355J2 hot rolled H-beam for a Ce-containing beam-column member, relating to the production of hot-rolled H-beams. The production process can ensure the performance of the hot-rolled H-beam with multiple classes from one steel grade, and achieve low cost, stability, uniformity, consistency, and narrow composition control of various elements. In the S355J2 hot-rolled H-beam for a Ce-containing beam-column member, a hot-rolled H-beam is prepared from the following compositions by mass fraction: 0.18%-0.20% of C, 0.25%-0.30% of Si, 1.22%-1.27% of Mn, less than or equal to 0.025% of P, less than or equal to 0.025% of S, 0.008%-0.011% of Nb, 0.008%-0.012% of V, 0.004%-0.008% of N, 0.0015%-0.0055% of Ce, less than or equal to 0.015% of Al, and the rest of Fe and inevitable impurities.

1 Claim, 21 Drawing Sheets

(51) Int. Cl.
*B22D 11/16* (2006.01)
*C21C 7/06* (2006.01)
*C21D 7/13* (2006.01)
*C22C 33/06* (2006.01)
*C22C 38/02* (2006.01)
*C22C 38/04* (2006.01)
*C22C 38/12* (2006.01)

(56) References Cited

OTHER PUBLICATIONS

CNIPA, Notification to grant patent right for Chinese application CN202411162596.5, Oct. 17, 2024.

* cited by examiner

PRODUCTION PROCESS OF S355J2 HOT-ROLLED H-BEAM FOR Ce-CONTAINING BEAM-COLUMN MEMBER

TECHNICAL FIELD

The present disclosure relates to the production of hot-rolled H-beams, and in particular to a production process of an S355J2 hot-rolled H-beam for a Ce-containing beam-column member.

BACKGROUND

At present, iron and steel enterprises are still facing some technical and application challenges in their continuous exploration of adding rare earth elements to steel, e.g., the addition method and amount of rare earth, and the mechanism of the rare earth in steel.

Research in China indicates that the rare earth plays two main roles in steel: the first is to purify the molten steel and improve the quality of the steel by modifying inclusions with the rare earth, and the second is to further optimize the performance of steel by rare earth microalloying.

At present, a production process of a hot-rolled H-beam is mainly divided into two categories:

One is that a special-shaped billet is continuously rolled in a reciprocating manner by a blooming roughing mill and an edge rolling machine, and then is continuously rolled in a reciprocating manner in a universal finishing mill and an edge rolling machine to obtain a finished product.

The other is that a rectangular billet, after being heated, is rolled into an I-shaped billet in a blooming mill, and then fed into a multi-stand universal mill for continuous hot rolling to acquire a finished product.

There are significant differences in the production and manufacturing processes between the shaped billet and the rectangular billet. A shaped billet mold has 12 faces and 12 corners, resulting in a more uneven billet shell and a thinner inner cavity. Therefore, factors, such as gas content in the steel, cleanliness of the molten steel, casting speed, a Mn/S ratio, a cooling rate, and mold flux, have a more significant impact on the quality of the shaped billet. In addition, the shaped billet is typically cast using a double-nozzle system. Due to the smaller nozzle diameter, problems, such as liquid level fluctuations, turbulent flow, and nozzle clogging, are prone to occurring during the production of aluminum-containing or rare earth-containing shaped billets, leading to cracks in the web of the shaped billet. In contrast, the production of the rectangular billet can effectively avoid the above surface quality problems. Moreover, hot continuous rolling is often employed in the rolling process, thus reducing both the manufacturing cost and the rolling process cost of the casting billet.

In view of restrictive conditions in the production of the shaped billet, it is not suitable to add a large amount of rare earth into such a billet during smelting of the molten steel, and it is difficult to achieve continuous casting. In contrast, the rectangular billet is simple in manufacturing process, stable in performance and low in cost, and a large casting nozzle diameter and a wide rolling process window of the rectangular billet make it possible to add a large amount of rare earth in during the smelting of the molten and achieve continuous casting.

The rare earth can play a role in purifying and denaturing inclusions in molten steel, and these characteristics are in match with the characteristics of the rectangular billet production line. By adding rare earth into existing building materials, the cleanliness of steel can be improved by modifying inclusions, making the products meet the performance requirements at both room temperature and low temperature. An objective is to develop a set of general process parameters and technical regulations with strong operability for mass production of low-cost and high-performance rare earth steel for the building.

The research in China also shows that the rare earth can promote the precipitation of Nb in steel and improve the utilization ratio of vanadium-niobium alloy elements, and the rare earth is used to purify the molten steel and modify inclusions, thus improving the mechanical properties of steel and reducing the cost. Therefore, this technology focuses on a preparation process for producing a hot-rolled H-beam by modifying inclusions of a rectangular billet with rare earth.

SUMMARY

The present disclosure provides a production process of an S355J2 hot-rolled H-beam for a Ce-containing beam-column member for the disadvantages in the prior art.

To achieve the objective above, the present disclosure employs the following technical solutions: in an S355J2 hot-rolled H-beam for a Ce-containing beam-column member, the hot-rolled H-beam is prepared from the following compositions by mass fraction:

0.18%-0.20% of C, 0.25%-0.30% of Si, 1.22%-1.27% of Mn, less than or equal to 0.025% of P, less than or equal to 0.025% of S, 0.008%-0.011% of Nb, 0.008%-0.012% of V, 0.004%-0.008% of N, 0.0015%-0.0055% of Ce, less than or equal to 0.015% of Al, and the rest of Fe and inevitable impurities.

Further, a cerium-iron alloy is used as an additive in the preparation of the hot-rolled H-beam (the chemical composition of the cerium-iron alloy is in terms of mass fraction), and an indicator control range of the cerium-iron alloy is as follows: the mass fraction of Ce is 29.9%-30.9%, the mass fraction of O is 0.0045%-0.0080%, the mass fraction of C is 0.013%-0.015%, the mass fraction of Si is 0.012%-0.013%, the mass fraction of Mn is 0.09%-0.012%, the mass fraction of P is less than 0.010%, the mass fraction of S is less than 0.0050%, and the rest is Fe and inevitable impurities.

A production process of the hot-rolled H-beam includes the following steps:

S1: smelting of hot-rolled H-beam;
S2: continuous casting operation; and
S3: rolling operation.

S1 includes the following steps:

1.1. charging: controlling a charging amount to be 115+/−2 tons, where in molten iron, a content of P is less than or equal to 0.120% and a content of S is less than or equal to 0.040%; and controlling a tapping amount to be 110 tons to achieve composition stabilization and refining treatment;

1.2. slagging by oxygen blowing: during steelmaking, controlling an operating oxygen pressure to be 0.8 MPa-1.4 MPa and an oxygen flow rate to be 16,500 $m^3$/h-19,000 $m^3$/h, and holding an oxygen lance at an endpoint for more than 40 seconds;

adjusting an adding amount of lime according to a silicon content of the molten iron by using a double-slag smelting method, controlling basicity of initial slag to be 1.5-2.0, basicity of slag to be 2.8-3.2 and magnesium oxide content to be 8%, thus controlling a smelting cycle to be 40-50 min per heat;

1.3. controlling compositions at an endpoint: during intermittent blowing, adjusting the flow rate to 18,000 $m^3$/h and more after carrying out intermittent blowing for 1 min to ensure that a carbon content in tapped steel meets tapping requirements after once intermittent blowing, wherein the compositions at the endpoint are controlled as follows: C is more than or equal to 0.06%, P is less than or equal to 0.030% and S is less than or equal to 0.030%, and tapping is carried out after results of sample analysis are acquired to ensure the accuracy of carburization;

1.4. controlling a temperature at the endpoint: controlling a tapping temperature to be 1,600° C.-1,700° C., and a continuous casting temperature to be 1,650° C.-1,680° C.;

1.5. deoxidation alloying: adding alloys along with a steel flow in the following sequence: adding deoxidizing elements, followed by alloying elements, namely, aluminum block→ferrosilicon→manganese-silicon→vanadium-nitrogen alloy, wherein the adding of the alloys is started when one-third of steel is tapped and completed before two-thirds of the steel is tapped, a slag stopper cone is used to ensure that a thickness of a slag layer of a ladle is not more than 55 mm, thus stabilizing an alloy yield and avoid rephosphorization of molten steel; and 1.6. blowing argon and controlling a temperature after argon blowing: carrying out argon blowing throughout the entire tapping process to ensure a slag blocking rate to be 100%;

carrying out a deoxidation alloying operation: aluminum block→ferrosilicon→manganese-silicon→vanadium-nitrogen→ferroniobium, wherein the adding of the alloys is started when one-third of the steel is tapped and completed before three-fourths of the steel is tapped;

controlling argon blowing at an argon station: enabling total argon blowing time to be 13 min; carrying out a teeming operation after adding a cerium-iron rare earth alloy, and after argon blowing, controlling to carry out strong blowing for 3 min and soft blowing for at least 7 min, wherein a diameter of exposed molten steel is not more than 200 mm during soft blowing.

Further, S2 includes the following steps:

2.1. controlling an initial casting temperature to be 1,550° C.-1,580° C., and a temperature of a tundish to be 1,530° C.-1,550° C.;

2.2. starting casting when a liquid level of the tundish exceeds 400 mm, and carrying out continuous casting when the liquid level is rapidly recovered to 800 mm or more;

2.3. controlling a casting speed as follows:

for a cross section of 320 mm×410 mm, controlling an initial casting speed to be 0.40 m/min-0.55 m/min, and a continuous casting speed to be 0.6 m/min-0.80 m/min;

for a cross section of 230 mm×350 mm, controlling the initial casting speed to be 0.8 m/min-1.0 m/min, and the continuous casting speed to be 1.0 m/min-1.50 m/min; and 2.4. controlling a straightening temperature of a continuous-casting billet to be higher than 880° C.; and 2.5. controlling a liquid level of the tundish to be less than or equal to 200 mm during continuous casting.

Further, S3 includes the following steps:

3.1. distinguishing steel billets: when changing steel grades, distinguishing steel billets of different heats by placing two refractory bricks or leaving two positions blank on a continuous-casting steel billet;

3.2. controlling a temperature of a heating furnace: for steel billets with different sizes, controlling a temperature of each section of a heating furnace as well as in-furnace time of the steel billet, specifically as follows:

for a steel billet with a cross section of 230 mm×230 mm, during hot charging, controlling a temperature at a first heating section to be less than or equal to 1,060° C., a temperature at a second heating section to be 1,210° C.-1,250° C., a temperature at a third heating section to be 1,260° C.-1,310° C., a temperature at a soaking section to be 1,250° C.-1,300° C., and the in-furnace time to be 150 min-180 min; during cold charging, controlling the temperature at the first heating section to be less than or equal to 1,100° C., the temperature at the second heating section to be 1,210° C.-1,260° C., the temperature at the third heating section to be 1,260° C.-1,310° C., the temperature at the soaking section to be 1,250° C.-1,315° C., and the in-furnace time to be 150 min-210 min;

for a steel billet with a cross section of 320 mm×410 mm, during hot charging, controlling the temperature at the first heating section to be less than or equal to 1,060° C., the temperature at the second heating section to be 1,210° C.-1,250° C., the temperature at the third heating section to be 1,260° C.-1,300° C., the temperature at the soaking section to be 1,250° C.-1,300° C., and the in-furnace time to be 150 min-180 min; during cold charging, controlling the temperature at the first heating section to be less than or equal to 1,100° C., the temperature at the second heating section to be 1,210° C.-1,260° C., the temperature at the third heating section to be 1,260° C.-1,310° C., the temperature at the soaking section to be 1,250° C.-1,315° C., and the in-furnace time to be 150 min-210 min;

3.3. controlling a temperature in rolling process: setting an initial rolling temperature, a finishing mill entry temperature, and a cooling bed entry temperature, respectively, specifically as follows:

for a hot-charged steel billet, setting the initial rolling temperature to be 1,150+/−30° C., the finishing mill entry temperature to be 1,000° C.-1,090° C., and the cooling bed entry temperature to be 800° C.-950° C.;

for a cold-charged steel billet, setting the initial rolling temperature to be 1,150+/−40° C., the finishing mill entry temperature to be 1,000° C.-1,090° C., and the cooling bed entry temperature to be 800° C.-950° C.; and descaling operation: during descaling, controlling a water pressure to be greater than 19 MPa and a running speed of the steel billet to be 1.0 m/s to ensure effective removal of an oxidized scale from the surface of the steel billet.

Compared with the prior art, the present disclosure has beneficial effects as follows:

A production process of an S355J2 hot-rolled H-beam for a Ce-containing beam-column member can ensure the performance of the hot-rolled H-beam with multiple classes from one steel grade, and achieve low cost, stability, uniformity, consistency, and narrow composition control of various elements.

BRIEF DESCRIPTION OF THE DRAWINGS

The present disclosure is further described below with reference to accompanying drawings and specific embodiments. The scope of protection of the present disclosure is not limited to the expression of the following content.

DETAILED DESCRIPTION OF THE EMBODIMENTS

Specific embodiments are provided as follows for better understanding of the technical solution of the present disclosure, and the following solutions are provided for illustrative purposes only.

Embodiment 1. Production Process of S355J2 Hot-Rolled H-Beam for Beam-Column Member The production process is as follows: molten iron in blast furnace-pretreatment of molten iron-smelting by top-bottom combined blowing of converter-continuous casting of square billet-feeding of casting billet-walking beam reheating furnace-primary dephosphorization with high-pressure water-blooming-universal continuous rolling of 11 stands-sampling by hot sawing-cooling by walking beam cooling bed-straightening-inspection of appearance and surface quality-sawing.

Key control parameters are as follows: the cerium-containing S355J2 hot-rolled H-beam in this embodiment is prepared from the following compositions in percentage by weight:

(1) the mass fraction of C is 0.19%, the mass fraction of S1 is 0.27%, the mass fraction of Mn is 1.23%, the mass fraction of P is 0.021%, the mass fraction of S is 0.022%, the mass fraction of V is 0.012%, the mass fraction of Nb is 0.010%, the mass fraction of Ce is 0.0032%, and the rest is Fe and inevitable impurities.

(2) A charging amount of molten iron is 110 tons, a charging amount of scrap steel is 5.2 tons, the total charging amount is 115.2 tons, and a temperature of the molten iron is 1,354° C.

(3) Compositions of the charged molten iron are as follows: 0.63% of Si, 0.104% f Mn, 0.076% of P, and 0.024% of S.

(4) 3,030 kg of lime, 1,255 kg of limestone, 850 kg of sintered ore, 3,240 kg of raw dolomite and 1,840 kg of coarse magnetism are added.

(5) The temperature of the molten iron when arrived at a converter is 1,610° C., a teeming temperature is 1,563° C., 1,870 kg of silicon-manganese, 120 kg of carburant, 10 kg of vanadium-nitrogen alloy, 15 kg of ferroniobium and 30 kg of aluminum ingot are added to alloy, strong blowing is carried out for 3 min, soft blowing is carried out for 10 min, intermittent blowing is carried for 10 s, and the alloy is supplemented with 80 kg of silicon-manganese, 10 kg of carburant and 10 kg of vanadium-nitrogen alloy.

(6) Argon blowing is required throughout the tapping process to avoid slag carryover, and a slag blocking rate is 100%. In a deoxidation alloying operation: aluminum block-ferrosilicon-manganese-silicon-vanadium nitrogen-ferroniobium, the addition of alloy is started when one-third of steel is tapped, and is completed before three-fourths of steel is tapped.

(7) Control of the addition of cerium-iron is as follows: after blowing argon at an argon station for 3 min, cerium-iron alloy is added.

(8) Argon blowing control at argon station is as follows: the total argon blowing time at the argon station is 13 min. After blowing argon for 3 min, 35 kg of cerium-iron rare earth alloy is added for teeming operation.

Figure 1:
FIG. 1 shows morphology of steel slag without rare earth before argon blowing.
Figure 2:
FIG. 2 shows morphology of steel slag with rare earth after argon blowing.

(9) Compositions of a slag sample in a converter before argon blowing are as follows: 34.46% of CaO, 13.87% of MnO, 1.39% of $TiO_2$, 32.01% of $SiO_2$, 6.74% of MgO, 1.98% of $Fe_2O_3$, 10.89% of $Al_2O_3$, less than 0.0005% of Ce, and the morphology of the slag sample is shown in FIG. 1. Compositions of the slag sample in the converter after argon blowing are as follows: 31.34% of CaO, 12.15% of MnO, 1.41% of $TiO_2$, 34.00% of $SiO_2$, 6.51% of MgO, 2.69% of $Fe_2O_3$, 11.29% of $Al_2O_3$, 0.163% of Ce, and the morphology of the slag sample is shown in FIG. 2.

(10) Compositions at an endpoint of the converter are as follows: the mass fraction of C is 0.19%, a mass fraction of Si is 0.27%, the mass fraction of Mn is 1.23%, the mass fraction of P is 0.021%, the mass fraction of S is 0.022%, the mass fraction of V is 0.012%, the mass fraction of Nb is 0.010%, and the mass fraction of Ce is 0.0032%.

(11) 5-flow casting is carried out with the casting speed of 0.5 m/min, and there is no fluctuation in the casting speed. During the casting, a thickness of a liquid slag layer is 10 mm, an internal slag layer is normal in structure, and there is no caking and slag turning. By tracking an offline submerged nozzle, there is no nodulation inside, and the overall casting process is good.

(12) A temperature at a soaking section of a heating furnace is 1,280° C., a blooming temperature is 1,150°

C., a finishing mill entry temperature is 1,059° C., a finishing mill exit temperature is 959° C., and a cooling bed entry temperature is 895° C.

2. Effect of Ce on Steel Slag

In order to fully compare the changes of the steel slag before and after rare earth is added, a slag sample is taken after the molten steel is subjected to argon blowing at the argon station for 3 min, cerium-iron rare earth alloy is added after carrying out argon blowing for 3 min, and then the slag sample is taken again for teeming operation after the total argon blowing time at the argon station is 13 min.

The morphology of the slag sample is shown in FIG. 1 and FIG. 2. As can be seen that the steel slag is black before the rare earth is added. In FIG. 1, the black steel slag contains a lot of iron and other metal oxides. This steel slag is obviously black due to the existence of iron during smelting, and its surface is rough, showing a blocky or flaky structure. The black steel slag is rich in iron and other metal elements, leading to low metal utilization rate. After carrying out argon blowing for 3 min, the steel slag with the cerium-iron rare earth alloy shows a green glass shape, with smooth surface, uniform color, and compact internal structure. As can be seen from the comparative analysis of the compositions of the steel slag that the metal utilization rate is significantly improved after the rare earth is added.

Table 1 shows comparison of compositions of steel slag without rare earth before argon and with rare earth after argon. The total oxygen content of S355J2 before and after argon blowing remains basically unchanged, the total oxygen content of S355J2 (Ce) after argon blowing is reduced by 8.640 in comparison with that before argon blowing, and the metal utilization rate of S355J2 after argon blowing remains unchanged, and the metal utilization rates of manganese and iron of S355J2 (Ce) after argon blowing are increased by 2.82 and 5.820%, respectively.

in the subsequent processing, welding and service to cause damage to the matrix, thus leading to the failure of the beam-column service process.

Figure 5:
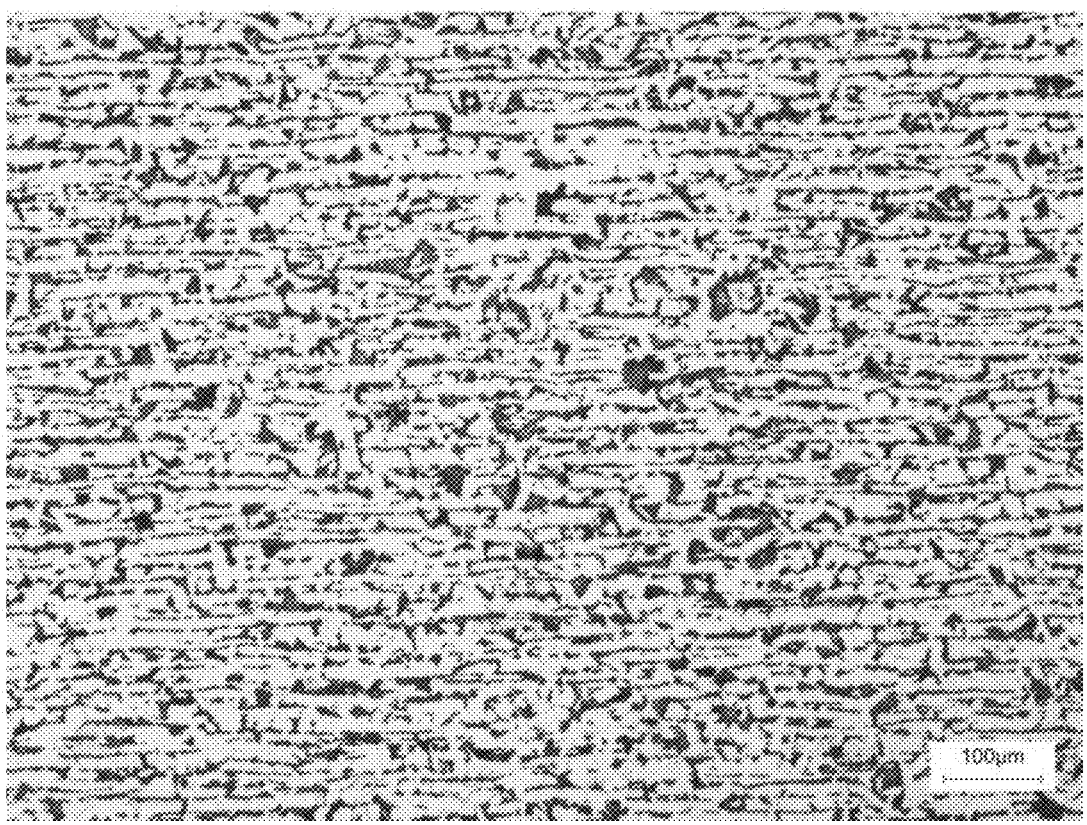
FIG. 5 shows a banded structure (pearlite+ferrite) of S355J2 (Re) with rare earth.
Figure 6:
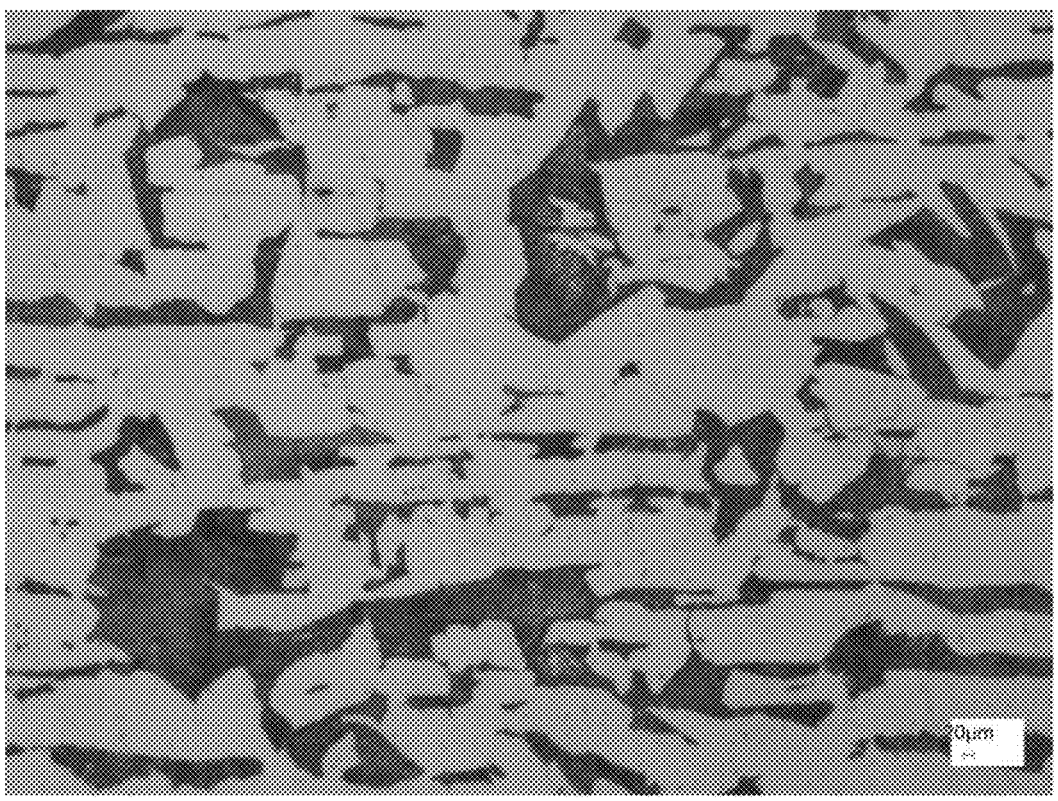
FIG. 6 shows morphology of polygonal ferrite of S355J2 (Re) with rare earth.

According to *Inspection methods of microstructure for metals* (GB/T 13298-2015) and *Determination of estimating the average grain size of metal* (GB/T 6394-2017), it can be seen from the figure that the microstructures of 101#, 102# and 103# S355J2 (Re) steels produced in three heats are the same, by employing ZEISS Axiovert 40 metallographic microscope, the microstructures are mainly polygonal ferrite and pearlite strips along the rolling direction, as shown in FIG. 5 and FIG. 6. Table 2 shows chemical compositions in S355J2 (Re) produced in three industrial heats.

TABLE 2

Chemical compositions (Wt %) of S355J2 (Re)

| Serial number | C | Si | Mn | P | S | V | Nb | Ce |
|---|---|---|---|---|---|---|---|---|
| 101# | 0.18 | 0.20 | 1.23 | 0.025 | 0.026 | 0.011 | 0.01 | 0.0036 |
| 102# | 0.19 | 0.25 | 1.25 | 0.024 | 0.024 | 0.011 | 0.01 | 0.0025 |
| 103$ | 0.20 | 0.29 | 1.27 | 0.023 | 0.023 | 0.012 | 0.009 | 0.0015 |

Rare earth inclusions in sample 101# are rated as follows: Type A (Sulfide): Grade 0.5; Type B (Alumina): Grade 0.5; Type C (Silicate): Grade 1.0; inclusions in sample 102# are rated as follows: Type A (Sulfide): Grade 2.0; Type B (Alumina): Grade 0.5; Type C (Silicate): Grade 2.0; inclusions in sample 103# are rated as follows: Type A (Sulfide): Grade 0.5; Type B (Alumina): Grade 1.5; and Type C (Silicate): Grade 1.5. In S355J2 steel without adding rare earth produced by the enterprise, the morphology of Type A

TABLE 1

Comparison of compositions (Wt %) of steel slag without rare earth before argon and with rare earth after argon

| Grade | Procedure | CaO | MgO | $SiO_2$ | $Al_2O_3$ | TiO | MnO | Fe | Ce |
|---|---|---|---|---|---|---|---|---|---|
| S355J2 | Before argon blowing | 18.12 | 3.87 | 39.22 | 9.102 | 1.289 | 22.38 | 3.20 | <0.0005 |
|  | After argon blowing | 18.02 | 3.71 | 39.07 | 9.010 | 1.277 | 22.18 | 2.98 | <0.0005 |
| S355J2(Ce) | Before argon blowing | 32.30 | 6.32 | 20.54 | 9.40 | 0.998 | 11.80 | 7.80 | <0.0005 |
|  | After argon blowing | 32.26 | 6.70 | 34.76 | 12.26 | 1.096 | 8.98 | 1.98 | 0.115 |

Figure 3:
FIG. 3 shows morphology of Type A sulfide inclusions without rare earth.
Figure 4:
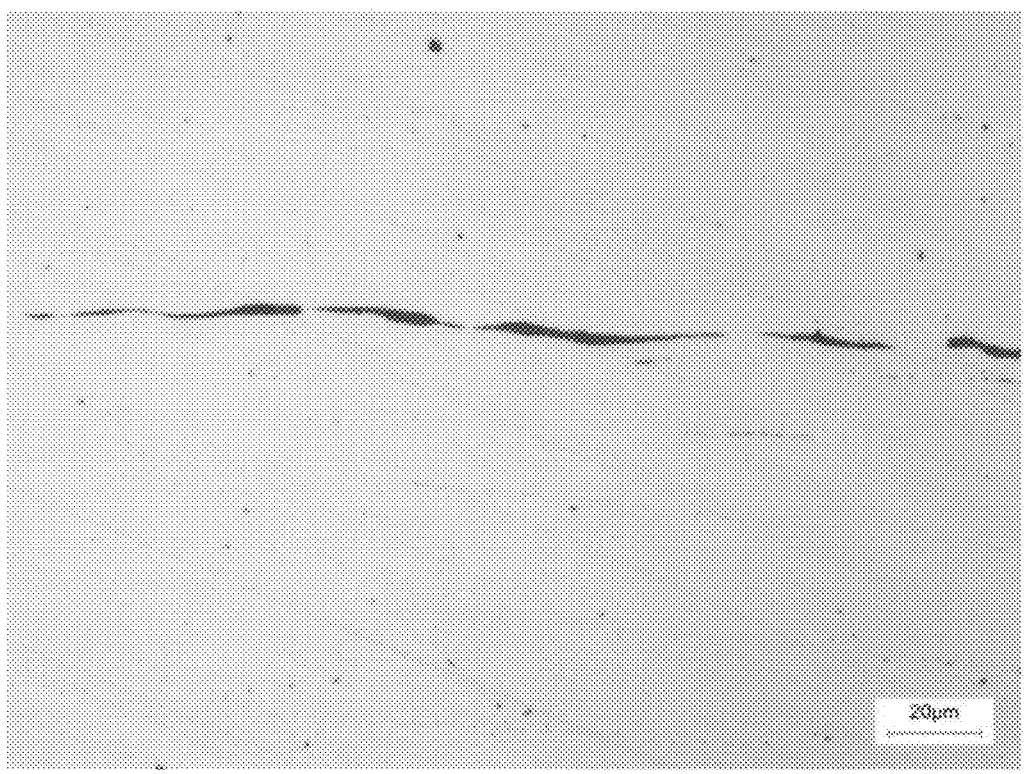
FIG. 4 shows morphology of Type C silicate inclusions without rare earth.
Figure 7:
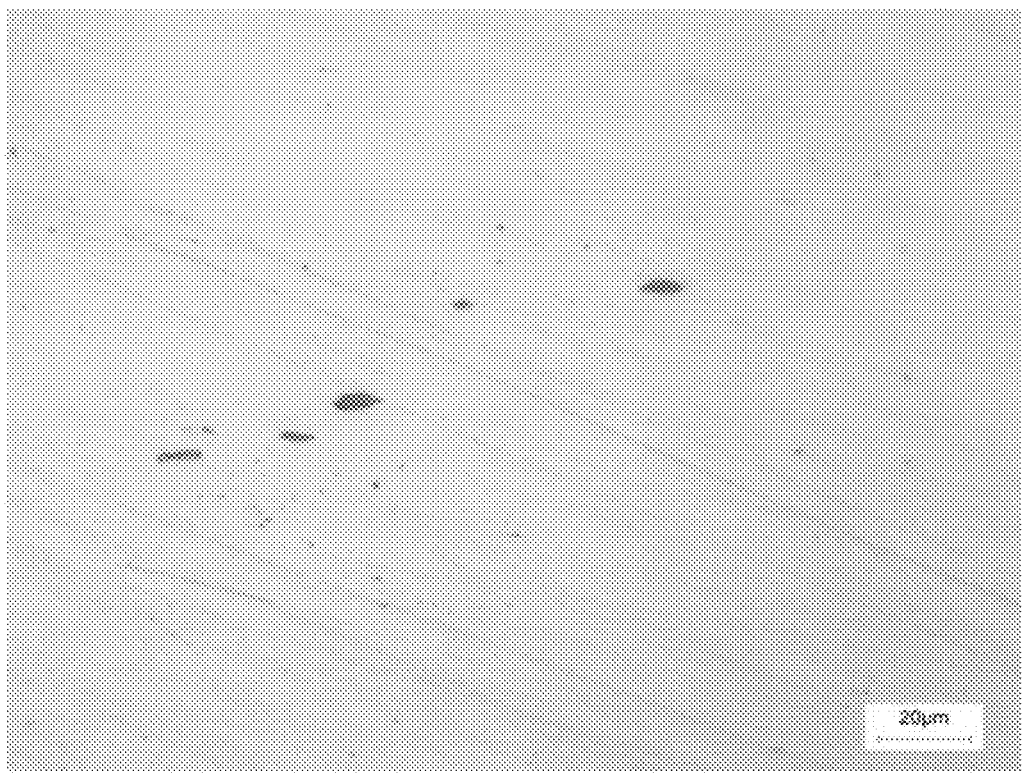
FIG. 7 shows morphology of Type A sulfide inclusion in S355J2 (Re)
Figure 8:
FIG. 8 shows morphology of Type C silicate inclusion in S355J2 (Re)

3. Effect of Ce on High-Magnification Microstructure and Modified Inclusions 3.1. Metallographic Structure and Compositions of Rare Earth Inclusions Inclusions in steel can be divided into Type A sulfide inclusions, Type B alumina inclusions, Type C silicate inclusions, Type D spherical oxides, and Type Ds single particle spherical oxides. The inclusions in the hot-rolled S355J2 steel produced by the enterprise are arranged in one or more rows along a rolling line, as shown in FIG. 3 and FIG. 4 under a metallographic microscope. This strip-shaped inclusion is embedded in the steel matrix, leading to a destructive effect on the continuity of the steel matrix, and becomes a stress concentration point after undergoing stress sulfide is a gray strip with rounded ends. In 101#, 102# and 103# S355J2 (Re) samples added with rare earth, the morphology of Type A sulfide is short rod or ellipsoid, and some Type A sulfides have black cones at their ends. Type A sulfide in S355J2 (Re) is rare earth complex inclusion ARES (rare earth sulfide), as shown in FIG. 3 and FIG. 4. Compared with S355J2 steel without rare earth produced by the enterprise, the morphology of Type C silicate is a black or dark gray strip, while the morphology of Type C silicate in 101#, 102# and 103# S355J2 (Re) samples added with rare earth is a strip, but a crystal glass state appears in the strip, which is a complex inclusion formed by sulfide and silicate, as shown in FIG. 7 and FIG. 8.

3.2 Effect of Rare Earth on Morphology and Size of Inclusion

Rare earth element Ce has extremely high chemical activity. In molten steel, an absolute value of standard Gibbs free energy of formation of $Ce_2O_3$ is comparable to that of CaO, demonstrating excellent deoxidation and desulfurization capabilities. After the rare earth Ce is added to molten steel, a series of reactions will take place. The priority order of desulfurization and deoxidation of 1 molCe at 1873K is $CeO_2 \rightarrow Ce_2O_3 \rightarrow Ce_2O_2S \rightarrow Ce_2S_3 \rightarrow Ce_3S_4 \rightarrow CeS$. As can be seen from thermodynamics that the chemical properties of the rare earth Ce are active. The Ce, after being added to the molten steel, will react with elements such as Al, Mn, O and S to form rare earth inclusions, and will also react with oxides and silicate inclusions to form complex inclusions. After adding the rare earth Ce element into the steel, the inclusions are obviously deteriorated and spherical, or the rare earth Ce element can make the striped inclusions become short rod-shaped, elliptical or spherical composite inclusions, thus reducing stress concentration and improving mechanical properties.

Figure 9:
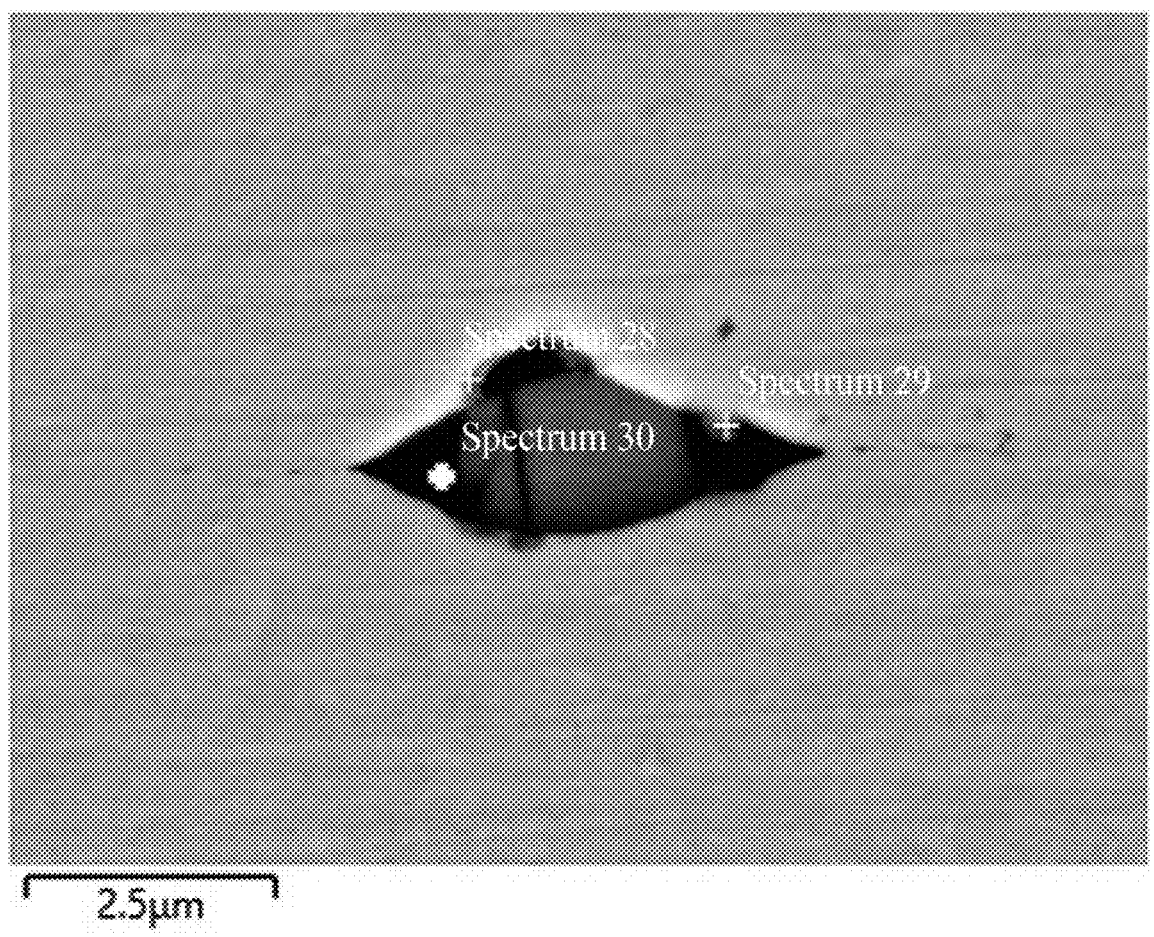
FIG. 9 shows SEM (Scanning Electron Microscopy) morphology of 101# S355J2 (Re) sample added with a rare earth complex inclusion.
Figure 10:
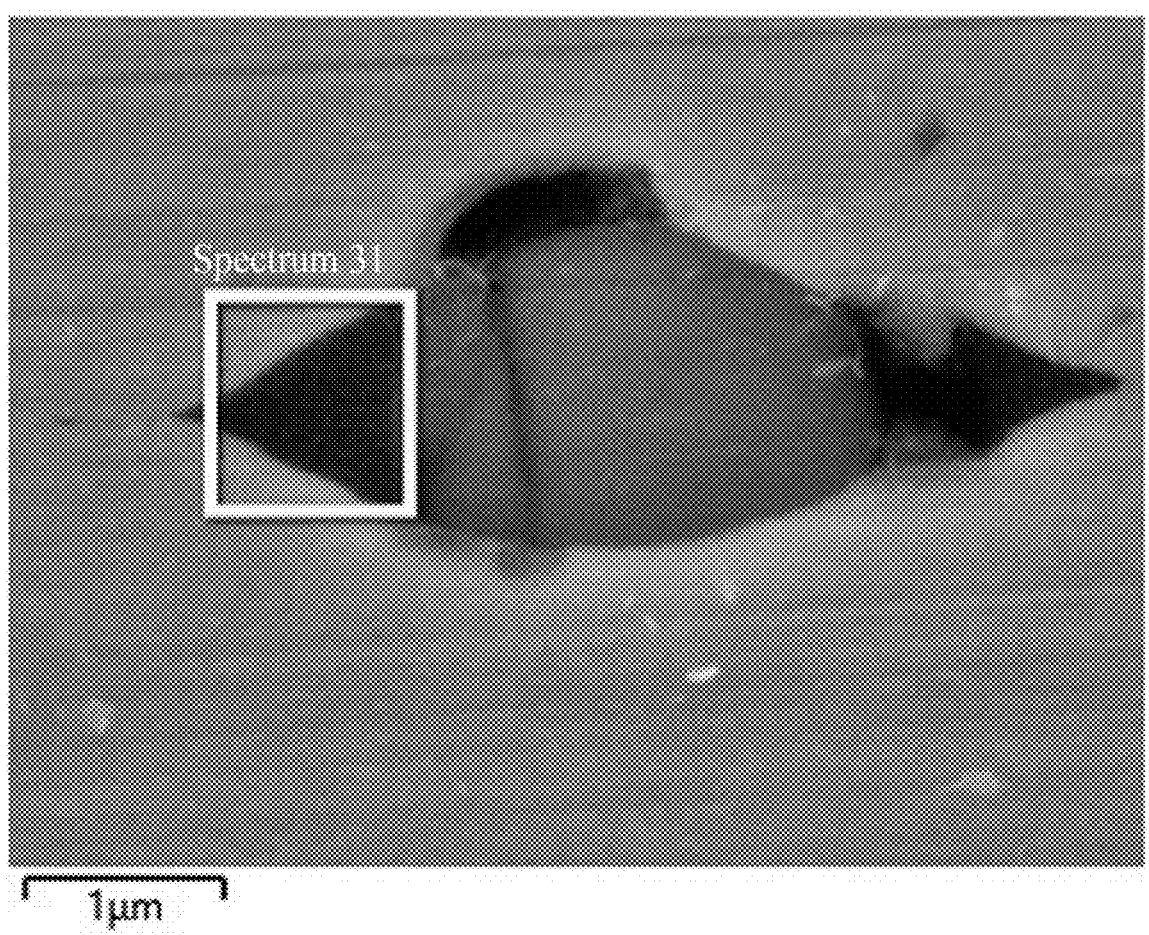
FIG. 10 shows SEM morphology and an energy spectrum analysis area of 101# added with a rare earth complex inclusion.
Figure 11:
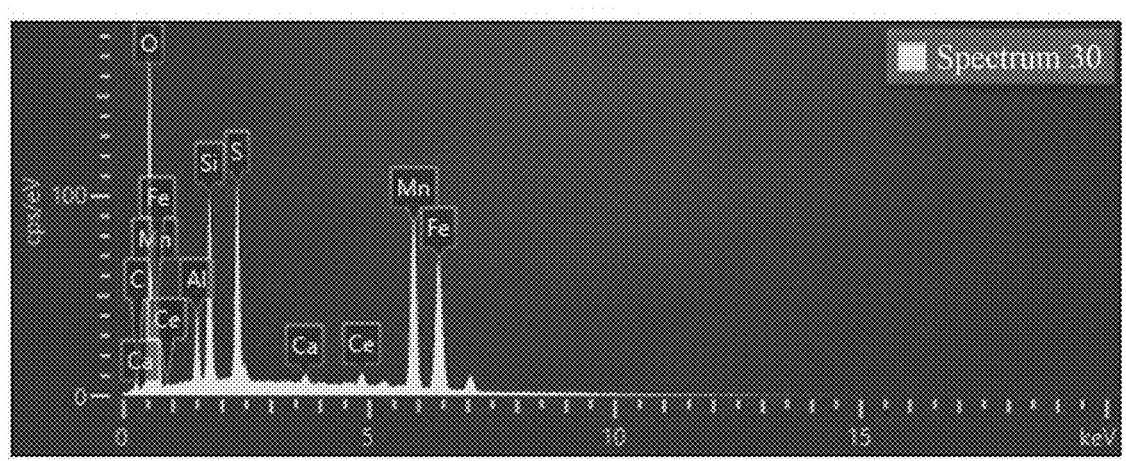
FIG. 11 shows energy spectrum analysis of a rare earth complex inclusion in 101#.

FIG. 9 and FIG. 10 are scanning electron microscope pictures of 101# added with a rare earth complex inclusion, and FIG. 11 is energy spectrum analysis of the rare earth complex inclusion. The formed rare earth composite inclusions are small in size, elliptical in shape and smooth in edge, and the rare earth elements tend to encapsulate from the periphery of the manganese sulfide inclusions. As can be seen from energy spectrum analysis that the inclusions contain elements such as C, O, Si, Al, Ca, Fe, Mn, S and Ce, and the statistical analysis results are shown in Table 3.

Figure 12:
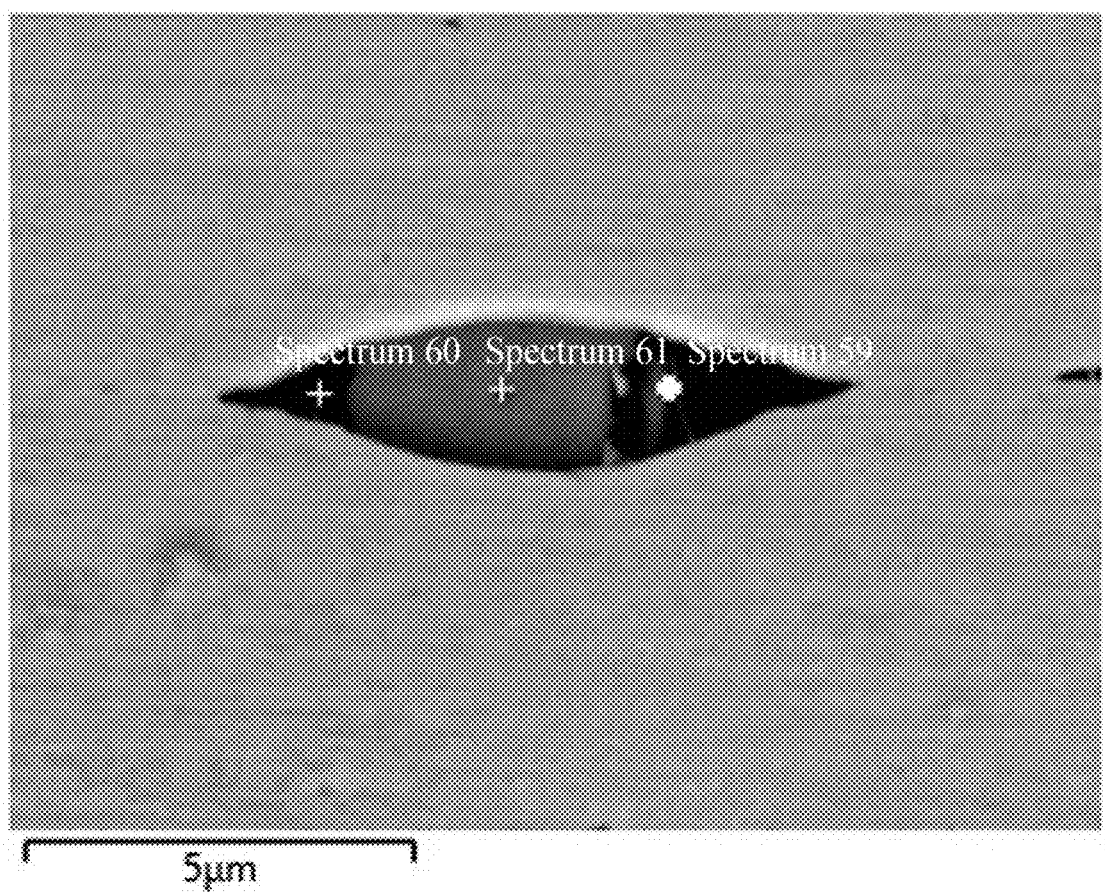
FIG. 12 shows SEM morphology of 102# S355J2 (Re) sample added with a rare earth complex inclusion.
Figure 13:
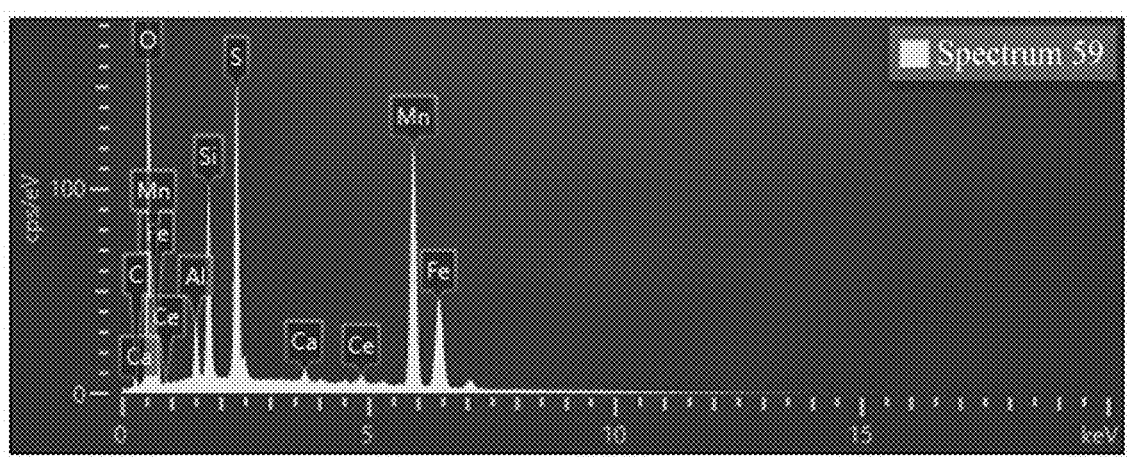
FIG. 13 shows an energy spectrum analysis diagram of a rare earth complex inclusion in 102#.

FIG. 12 is a scanning electron microscope picture of morphology of 102# added with a rare earth complex inclusion, and FIG. 13 is energy spectrum analysis of the rare earth complex inclusion. The formed rare earth composite inclusions are small in size, elliptical in shape and smooth in edge, and the rare earth elements tend to encapsulate the manganese sulfide (MnS) inclusions from both ends towards the center. As can be seen from energy spectrum analysis that the inclusions contain elements such as C, O, Si, Al, Ca, Fe, Mn, S and Ce, and the statistical analysis results are shown in Table 4. Spectrum 28, Spectrum 29, Spectrum 30, and Spectrum 31 correspond to point scanning locations in FIG. 9 and FIG. 10, respectively. Spectrum 59, Spectrum 60, and Spectrum 61 correspond to point scanning locations in FIG. 12, respectively.

TABLE 3

Quantification of content (Wt %) of elements in different regions of 101# added with rare earth complex inclusions

| Spectrum number | C | O | Al | Si | S | Ca | Mn | Fe | Ce |
|---|---|---|---|---|---|---|---|---|---|
| Spectrum 28 | 2.76 | 16.11 | 2.42 | 6.64 | 5.49 | 0.44 | 25.74 | 36.68 | 3.48 |
| Spectrum 29 | 1.67 | 8.45 | 1.23 | 2.65 | 7.34 | 0.44 | 30.13 | 45.41 | 2.68 |
| Spectrum 30 | 4.01 | 17.65 | 2.67 | 6.53 | 8.35 | 0.45 | 30.04 | 26.61 | 3.71 |
| Spectrum 31 | 5.43 | 9.73 | 1.57 | 3.82 | 4.66 | 0.29 | 16.77 | 56.05 | 1.30 |

TABLE 4

Quantification of content (Wt %) of elements in different regions of 102# added with rare earth complex inclusions

| Spectrum number | C | O | Al | Si | S | Ca | Mn | Fe | Ce |
|---|---|---|---|---|---|---|---|---|---|
| Spectrum 59 | 0.24 | 0.19 | 0.07 | 0.09 | 0.10 | 0.05 | 17.70 | 15.42 | 0.86 |
| Spectrum 60 | 1.67 | 8.45 | 1.23 | 2.65 | 7.34 | 0.44 | 30.13 | 11.43 | 2.68 |
| Spectrum 61 | 4.01 | 17.65 | 2.67 | 6.53 | 8.35 | 0.45 | 30.04 | 26.61 | 3.71 |

Figure 14:
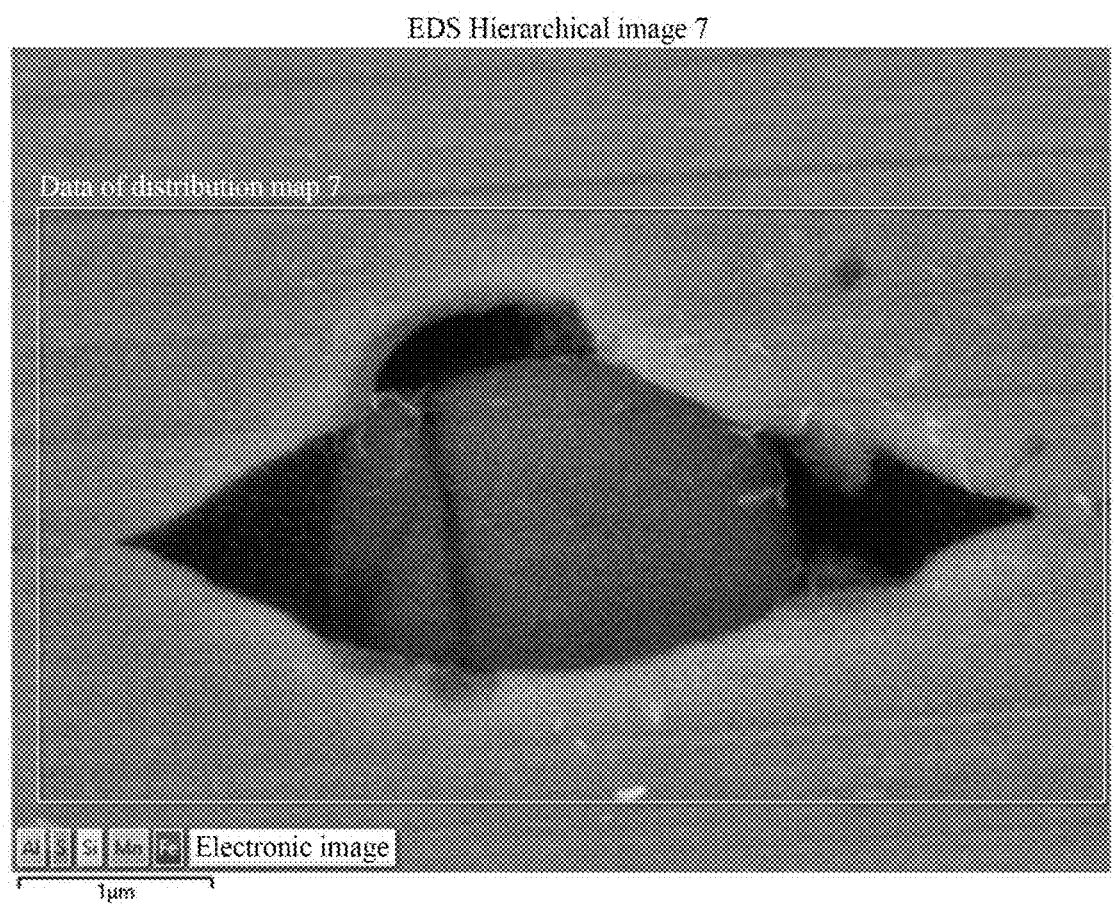
FIG. 14 shows an EDS (Energy Dispersive Spectroscopy) morphology diagram of a rare earth complex inclusion.
Figure 15:
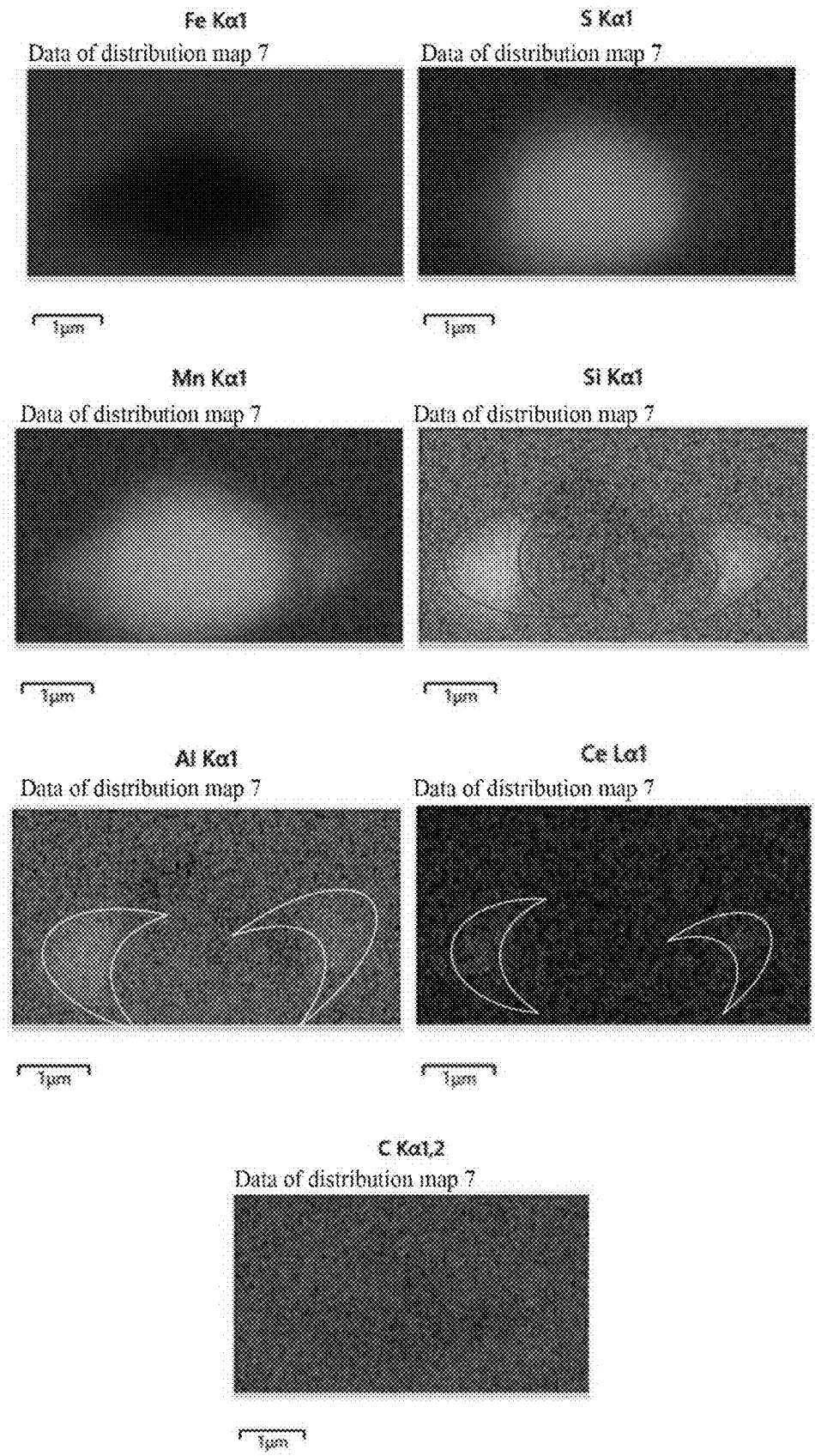
FIG. 15 shows a distribution diagram of elements in EDS morphology of a rare earth complex inclusion.

The element distribution and the element enrichment region in the inclusion can be seen from scanning pictures in FIG. 14 and FIG. 15. The rare earth element Ce is enriched around the inclusions and at protruding black head regions at the ends. These regions are also rich in Si and Al elements, while Mn and S elements are enriched in the central region. As can be seen from the growth trend of the inclusions that the rare earth element Ce, Si and Al elements, which form an outer layer, tend to encapsulate the central MnS inclusions to form forming ellipsoidal rare earth complex inclusions.

Rare earth elements are usually added after deoxidation and desulfurization of the molten steel. In this case, the rare earth elements can modify oxide and sulfide inclusions in the molten steel to generate fine and nearly spherical rare earth compounds. Thermal expansion coefficients of MnS and $Al_2O_3$ are $18.1 \times 10^{-6}/°$ C. and $8.0 \times 10^{-6}/°$ C., respectively, which differ significantly from that of the iron matrix ($12.5 \times 10^{-6}/°$ C.). In the hot working process of steel, not only will a stress field be formed, leading to the crack source and endangering the mechanical properties of steel, but also the inclusion will not be connected to the surrounding matrix, causing corrosion. In contrast, the thermal expansion coefficient of the rare earth inclusion is $11.5 \times 10^{-6}/°$ C., which is particularly close to that of the iron matrix, and thus fine rare earth inclusions can eliminate the adverse effects caused by conventional inclusions on the steel.

In a method for obtaining fine rare earth inclusions, on the one hand, it is essential to minimize the oxygen and sulfur content in the molten steel as much as possible, on the other hand, the rare earth content should fall within an optimal range. If the steel is not sufficiently pure or the rare earth is added excessively, the resulting complex compounds will be aggregated into larger particles, and after rolling, the large particles can form chain-like inclusions and generate RE-Fe brittle intermetallic compounds, which deteriorate the performance of the steel. In general, when the ratio of RE to (O+S) is more than 0.8, fine rare earth inclusions can be obtained.

Figure 16:
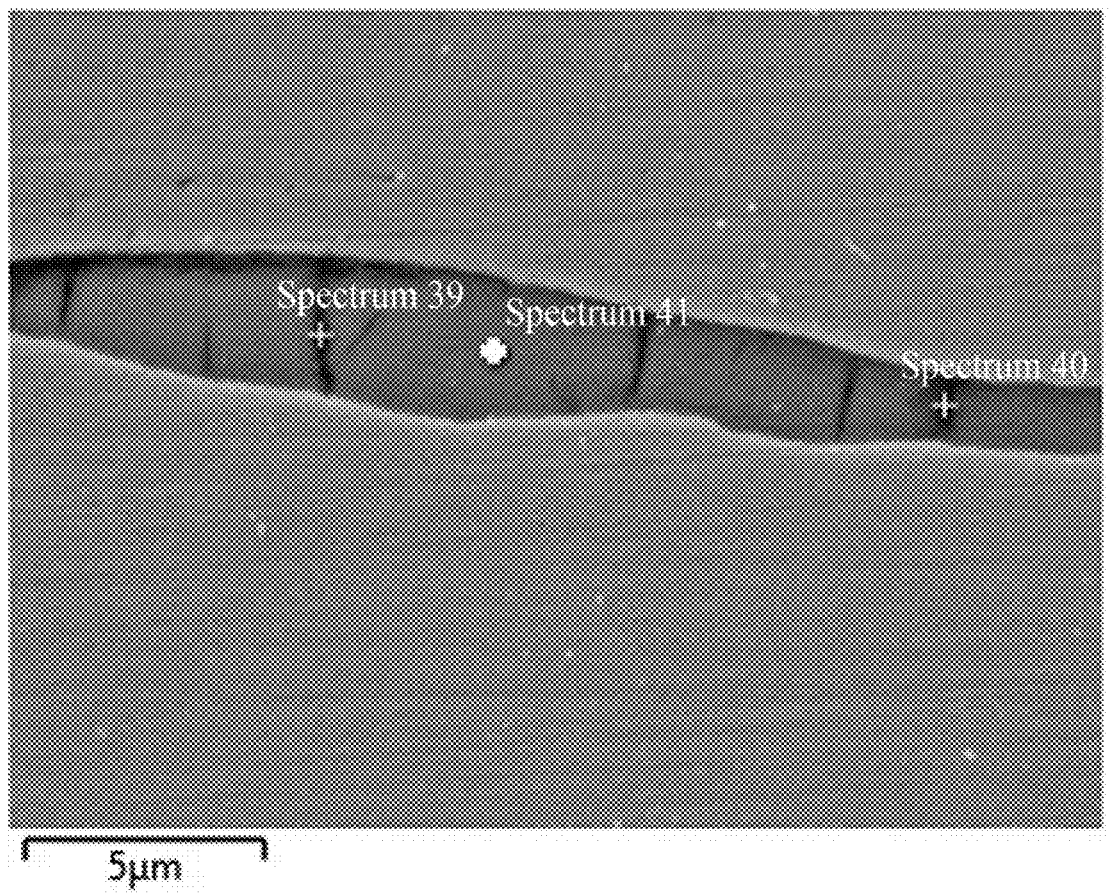
FIG. 16 shows fracture morphology of sulfide.

3.3. Analysis of Size and Number of Rare Earth Inclusions:

The rare earth inclusions in sample 101# are rated as follows: Type A (Sulfide): Grade 0.5; Type B (Alumina): Grade 0.5; Type C (Silicate): Grade 1.0; the inclusions in sample 102# are rated as follows: Type A (Sulfide): Grade 2.0; Type B (Alumina): Grade 0.5; Type C (Silicate): Grade 2.0; and the inclusions in sample 103# are rated as follows: Type A (Sulfide): Grade 0.5; Type B (Alumina): Grade 1.5; and Type C (Silicate): Grade 1.5. As can be seen from the ratings of the inclusions in the three samples that the types of the inclusions are mainly sulfide and silicate. When the Type A inclusion is a long strip and has a length ranging from 37 μm to 436 μm, the inclusions will be truncated first, and then the rare earth composite inclusions can be further formed after the inclusions become fine. FIG. 16 is a photo of sulfide fracture magnified by 10,000 times.

Figure 17:
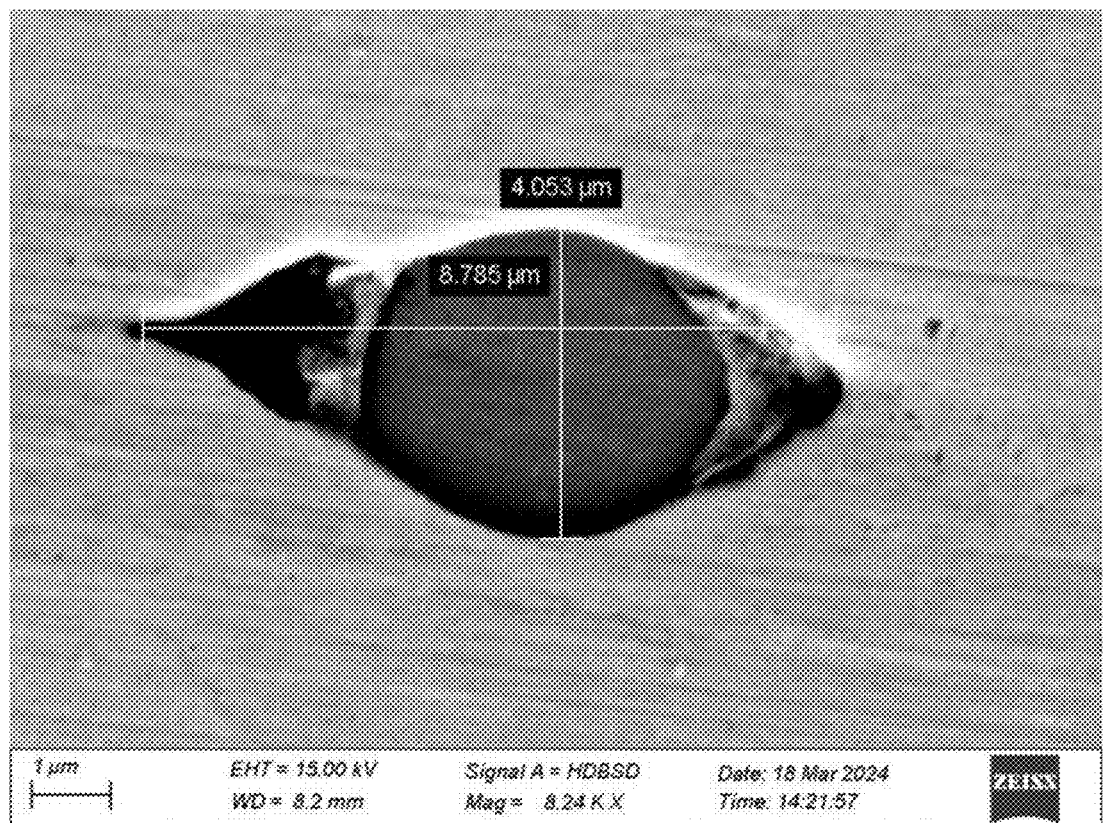
FIG. 17 is a length-to-diameter ratio of an inclusion after rare earth treatment.

After adding the rare earth into test steels from three heats, the size of inclusions in the sample that tend to be elliptical has increased, and the length-diameter ratio is mostly from 2:1 to 6:1. The existence of rare earth Ce found in the complex inclusions proves that the Ce is added into the steel to modify the inclusion, which makes the single flat MnS inclusions tend to generate small-sized elliptical MnS and compounded with the inclusions of rare earth Al and Si. The length-diameter ratio of the rare earth composite inclusion is shown in FIG. 17, and the size of the rare earth complex inclusion is mostly 37 μm.

Figure 18:
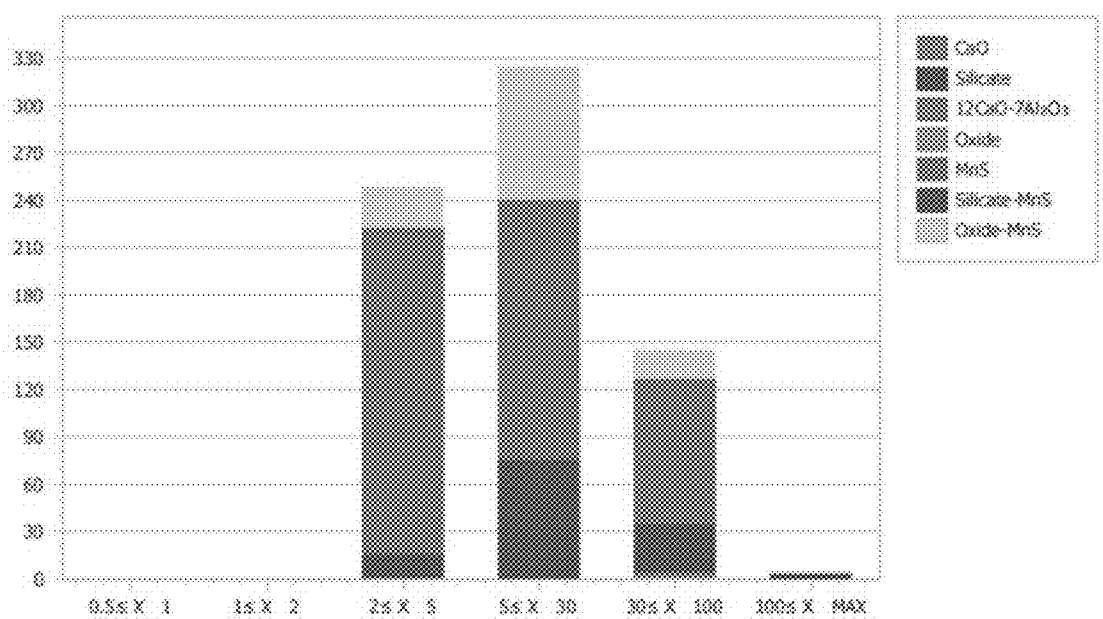
FIG. 18 shows a histogram of size distribution of inclusions.
Figure 19:
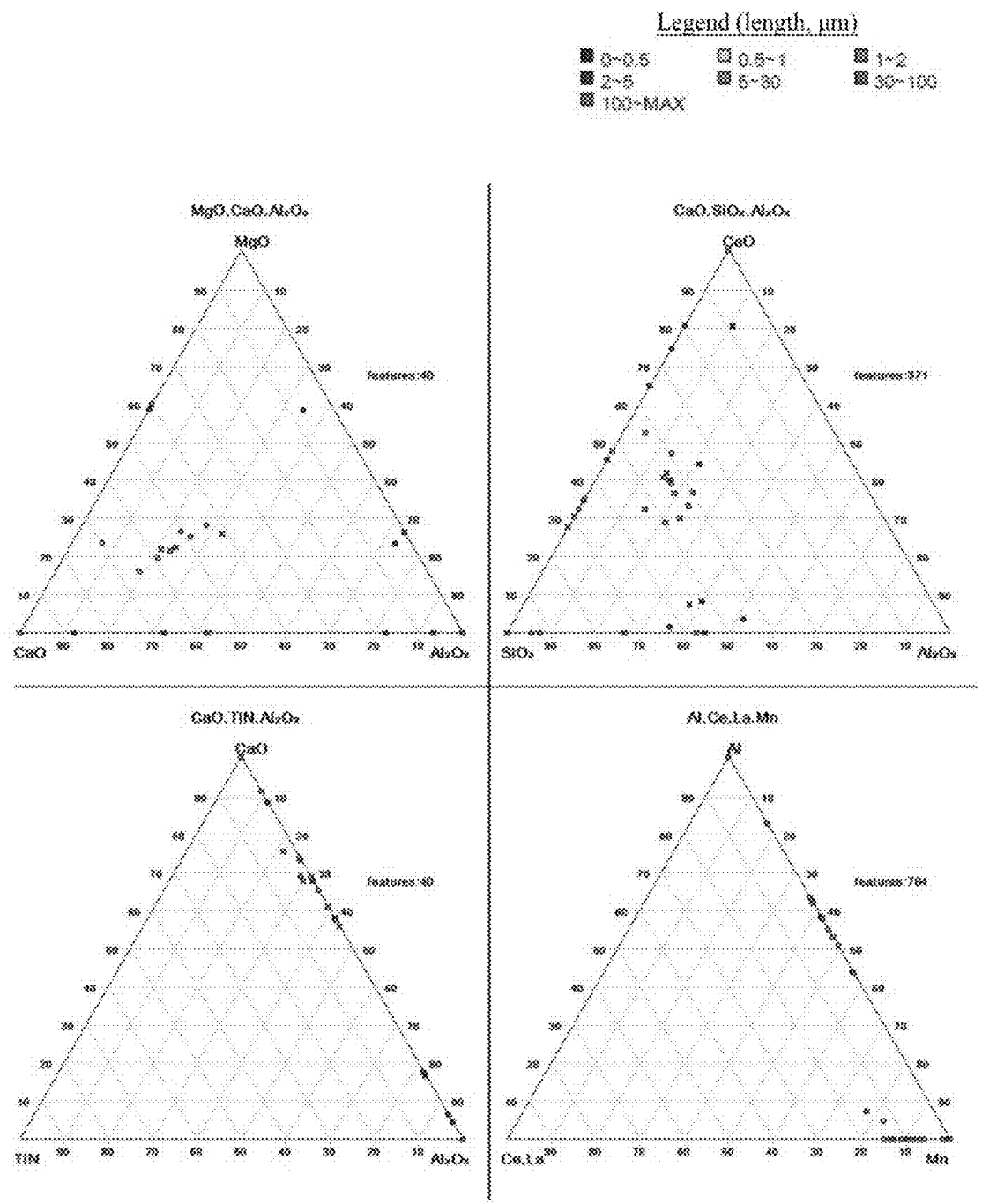
FIG. 19 shows composition of inclusions with different sizes.
Figure 20:
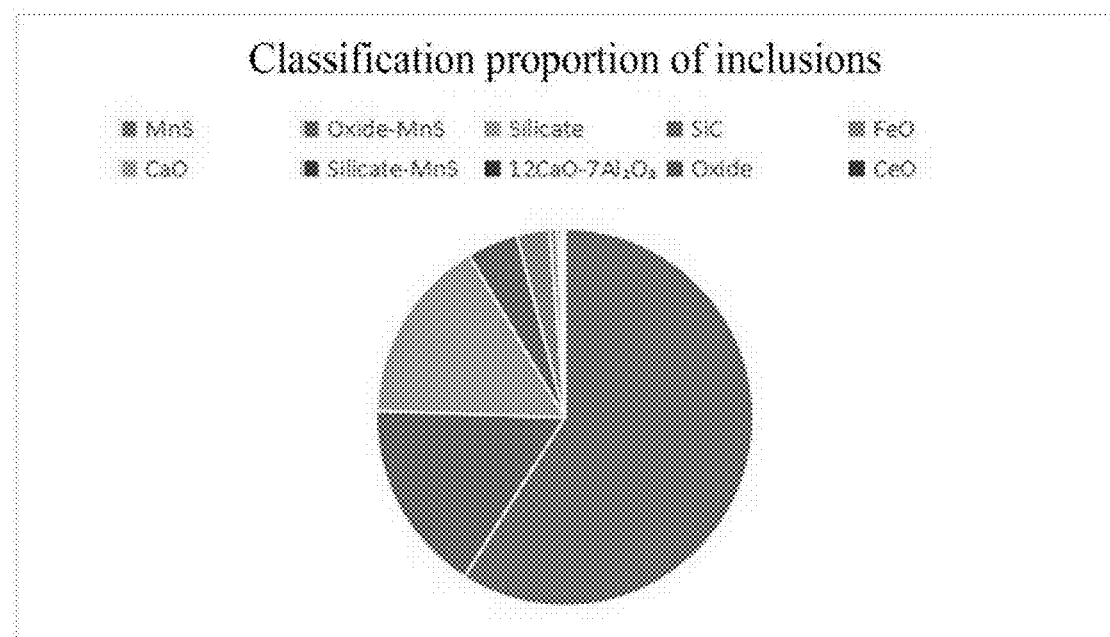
FIG. 20 shows proportion of different inclusion types.

The samples of 101#, 102# and 103# produced in industry are counted for the number of rare earth complex inclusions, respectively, and the region is scanned by a field emission scanning electron microscope at the magnification of 601 times. The scanning time is 58.2 m, the field of view area is 3,276,075 μm², the total number of visual fields is 121, and the scanning lasts for four hours. The data is analyzed and counted by OTS software, as shown in Table 5. It can be seen that the size of inclusions is concentrated at 2-30 μm. FIG. 18 shows a histogram of the size of inclusions, FIG. 19 shows the composition of inclusion types with different sizes, and FIG. 20 shows a proportion of rare earth complex inclusions, where the proportion of modified complex rare earth inclusions ranges from 0.03% to 0.12%.

and inclusions. Through grain boundary purification and inclusion modification, the rare earth elements can enhance the strength of grain boundaries, and reduce the likelihood of crack propagation through defects. As a result, the material can absorb more energy from crack extension when subjected to impact loads. However, brittle and hard rare earth non-metallic inclusions and intermetallic compounds are formed when the rare earth elements are added excessively, which makes the grain boundary strength weakened and deteriorates the impact performance of the material.

Table 6 shows the performance of the experimental steel with rare earth. Under the same process, and the impact of adding rare earth elements on impact toughness is compared with that of not adding rare earth elements. The results indicate that rare earth elements have changed the nature and shape of the inclusions, and changed the banded plastic MnS inclusions into spherical rare earth sulfur oxides which are difficult to deform. The inclusions will not elongate along the rolling direction during rolling, while the spherical inclusions can greatly reduce the stress concentration caused by banded inclusions and are not prone to transverse fracture, thus significantly increasing the value of impact work and improving the comprehensive performance of a steel plate.

Figure 21:
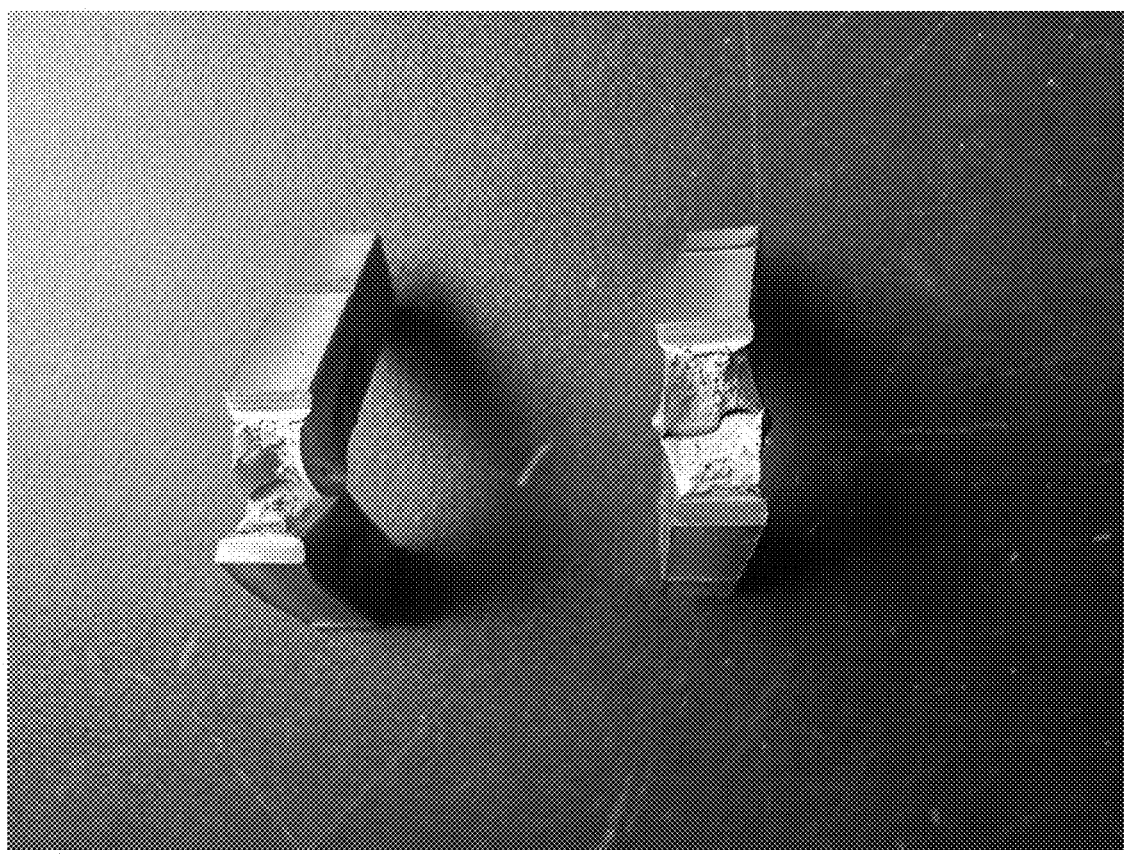
FIG. 21 shows morphology of an impact fracture surface.

FIG. 21 shows morphology of an impact fracture surface. As can be seen from the mechanical test data of a rare earth

TABLE 5

Analysis result of the size of inclusion particles
The calculation of size is based on: DMAX(μm)

| Classification | Secondary classification | Number | 0-0.5 | 0.5-1 | 1-2 | 2-5 | 5-30 | 30-100 | 100-MAX |
|---|---|---|---|---|---|---|---|---|---|
| Sulfide | | 459 | 0 | 0 | 206 | 163 | 90 | 0 | 0 |
| | MnS | 459 | 0 | 0 | 206 | 163 | 90 | 0 | 0 |
| Sulfide Oxide | | 131 | 0 | 0 | 26 | 85 | 19 | 1 | 0 |
| | Oxide-MnS | 129 | 0 | 0 | 26 | 84 | 18 | 1 | 0 |
| | Silicate-MnS | 2 | 0 | 0 | 0 | 1 | 1 | 0 | 0 |
| Oxide | | 131 | 0 | 0 | 16 | 76 | 36 | 3 | 0 |
| | Silicate | 124 | 0 | 0 | 4EIU | 75 | 31 | 3 | 0 |
| | CaO | 5 | 0 | 0 | 1 | 0 | 4 | 0 | 0 |
| | 12CaO—7Al$_2$O$_3$ | 1 | 0 | 0 | 0 | 1 | 0 | 0 | 0 |
| | Oxide | 1 | 0 | 0 | 0 | 0 | 1 | 0 | 0 |
| | | 721 | 0 | 0 | 248 | 324 | 145 | 4 | 0 |

4. Effect of Ce on the Performance

The strength and plasticity of the steel can be significantly improved by adding a small amount of rare earth, and there is a suitable adding amount due to effect of the rare earth elements on the mechanical property of S355J2. The existence of low-melting-point metal elements will reduce the impact toughness of materials, so the impact toughness of the materials can be improved by adding various rare earth elements. The reason why the rare earth elements affect impact performance lies in their effect on grain boundaries steel product produced in industry, the strength of S355J2 (Re) meets the technical requirements, where $KV_2$ (20° C.) is greater than 110 J, $KV_2$ (0° C.) is greater than 78 J, $KV_2$ (20° C.) is greater than 46.8 J, s fracture surface shrinkage rate is greater than 70% a toughness value can meet the requirements of impact toughness at 0° C., impact toughness at 20° C. and impact toughness at transverse 20° C. at the same time, and the alloy cost remains unchanged. As can be seen from the average impact toughness that the series impact values of S355J2 (Re) are all higher than S355J2.

TABLE 6

Comparative table of mechanical properties between S355J2 (Re) and S355J2

| Serial number of sample | Number of furnace | Specification | Sampling direction | Test temperature (° C.) | Impact absorption work ≥34 (J) | | | |
|---|---|---|---|---|---|---|---|---|
| | | | | | Impact work 1 | Impact work 2 | Impact work 3 | Impact work 4 |
| 101# S355J2 (Re) | 4101321 | 300*150*6.5*9 | Longitudinal | 20 | 133 | 123 | 147 | 133 |
| | | 300*150*6.5*9 | Longitudinal | 0 | 115 | 99.9 | 100 | 95.1 |
| | | 300*150*6.5*9 | Longitudinal | −20 | 56 | 54.3 | 58.9 | 56.4 |
| | | 300*150*6.5*9 | Horizontal | 20 | 64.8 | 61.6 | 63.2 | 63.2 |
| 102# S355J2 (Re) | 4101322 | 300*150*6.5*9 | Longitudinal | 20 | 128 | 125 | 104 | 119 |
| | | 300*150*6.5*9 | Longitudinal | 0 | 68.5 | 87.9 | 78.5 | 78.3 |
| | | 300*150*6.5*9 | Longitudinal | −20 | 44.1 | 45.3 | 51.1 | 46.8 |
| | | 300*150*6.5*9 | Horizontal | 20 | 62.2 | 69.5 | 64.7 | 62.1 |
| 103# S355J2 (Re) | 4103467 | 300*150*6.5*9 | Longitudinal | 20 | 122 | 89 | 122 | 111 |
| | | 300*150*6.5*9 | Longitudinal | 0 | 75 | 87 | 94 | 85 |
| | | 300*150*6.5*9 | Longitudinal | −20 | 66 | 86 | 62 | 71 |
| | | 300*150*6.5*9 | Horizontal | 20 | 66 | 54.3 | 78.9 | 66.4 |
| 104# S355J2 (Re) | 4101320 | 300*150*6.5*9 | Longitudinal | 20 | 99 | 89 | 109 | 99 |
| | | 300*150*6.5*9 | Longitudinal | 0 | 56 | 43 | 44 | 48 |
| | | 300*150*6.5*9 | Longitudinal | −20 | 33 | 24 | 19 | 25 |
| | | 300*150*6.5*9 | Horizontal | 20 | 65 | 15 | 70 | 50 |

Finally, it should be noted that the above embodiments are only used to illustrate the technical solution of the present disclosure rather than limiting. Although the present disclosure has been described in detail with reference to the foregoing embodiments, those of ordinary skill in the art should understand that it is still possible to modify the technical solution described in the foregoing embodiments, or to replace some technical features with equivalents. However, these modifications or substitutions do not make the essence of the corresponding technical solutions deviate from the spirit and scope of the technical solutions of various embodiments of the present disclosure.

What is claimed is:

1. An S355J2 hot-rolled H-beam for a Ce-containing beam-column member, wherein the hot-rolled H-beam is prepared from the following compositions by mass fraction: 0.18%-0.20% of C, 0.25%-0.30% of Si, 1.22%-1.27% of Mn, less than or equal to 0.025% of P, less than or equal to 0.025% of S, 0.008%-0.011% of Nb, 0.008%-0.012% of V, 0.004%-0.008% of N, 0.0015%-0.0055% of Ce, less than or equal to 0.015% of Al, and the rest of Fe and inevitable impurities;

a cerium-iron alloy is used as an additive in the preparation of the hot-rolled H-beam, and an indicator control range of the cerium-iron alloy is as follows: the mass fraction of Ce is 29.9%-30.9%, the mass fraction of O is 0.0045%-0.0080%, the mass fraction of C is 0.013%-0.015%, the mass fraction of Si is 0.012%-0.013%, the mass fraction of Mn is 0.09%-0.012%, the mass fraction of P is less than 0.010%, the mass fraction of S is less than 0.0050%, and the rest is Fe and inevitable impurities;

a production process of the S355J2 hot-rolled H-beam for a Ce-containing beam-column member comprises the following steps:

S1: smelting of hot-rolled H-beam;
S2: continuous casting operation; and
S3: rolling operation;

wherein S1 comprises the following steps:

1.1. charging: controlling a charging amount to be 115+/−2 tons, wherein in molten iron, a content of P is less than or equal to 0.120% and a content of S is less than or equal to 0.040%; and controlling a tapping amount to be 110 tons to achieve composition stabilization and refining treatment;

1.2. slagging by oxygen blowing: during steelmaking, controlling an operating oxygen pressure to be 0.8 MPa-1.4 MPa and an oxygen flow rate to be 16,500 m$^3$/h-19,000 m$^3$/h, and holding an oxygen lance at an endpoint for more than 40 seconds;

adjusting an adding amount of lime according to a silicon content of the molten iron by using a double-slag smelting method, controlling basicity of initial slag to be 1.5-2.0, basicity of slag to be 2.8-3.2 and magnesium oxide content to be 8%, thus controlling a smelting cycle to be 40-50 min per heat;

1.3. controlling compositions at an endpoint: during intermittent blowing, adjusting the flow rate to 18,000 m$^3$/h and more after carrying out intermittent blowing for 1 min to ensure that a carbon content in tapped steel meets tapping requirements after once intermittent blowing, wherein the compositions at the endpoint are controlled as follows: C is more than or equal to 0.06%, P is less than or equal to 0.030% and S is less than or equal to 0.030%, and tapping is carried out after results of sample analysis are acquired to ensure the accuracy of carburization;

1.4. controlling a temperature at the endpoint: controlling a tapping temperature to be 1,600° C.-1,700° C., and a continuous casting temperature to be 1,650° C.-1,680° C.;

1.5. deoxidation alloying: adding alloys along with a steel flow in the following sequence: adding an aluminum block for deoxidizing, followed by alloying elements, namely, aluminum block→ferrosilicon→manganese-silicon→vanadium-nitrogen alloy, wherein the adding of the alloys is started when one-third of steel is tapped and completed before two-thirds of the steel is tapped, a slag stopper cone is used to ensure that a thickness of a slag layer of a ladle is not more than 55 mm, thus stabilizing an alloy yield and avoid rephosphorization of molten steel; and 1.6. blowing argon and controlling a temperature after argon blowing: carrying out argon blowing throughout the entire tapping process to ensure a slag blocking rate to be 100%;

carrying out a deoxidation alloying operation: aluminum block→ferrosilicon→manganese-silicon→vanadium-nitrogen→ferroniobium, wherein the adding of the alloys is started when one-third of the steel is tapped and completed before three-fourths of the steel is tapped;

controlling argon blowing at an argon station: enabling total argon blowing time to be 13 min; carrying out a teeming operation after adding a cerium-iron rare earth alloy;

wherein S2 comprises the following steps:

2.1. controlling an initial casting temperature to be 1,550° C.-1,580° C., and a temperature of a tundish to be 1,530° C.-1,550° C.;

2.2. starting casting when a liquid level of the tundish exceeds 400 mm, and carrying out continuous casting when the liquid level is recovered to 800 mm or more;

2.3. controlling a casting speed as follows:

for a cross section of 320 mm×410 mm, controlling an initial casting speed to be 0.40 m/min-0.55 m/min, and a continuous casting speed to be 0.6 m/min-0.80 m/min;

for a cross section of 230 mm×350 mm, controlling the initial casting speed to be 0.8 m/min-1.0 m/min, and the continuous casting speed to be 1.0 m/min-1.50 m/min; and 2.4. controlling a straightening temperature of a continuous-casting billet to be higher than 880° C.;

wherein S3 comprises the following steps:

3.1. distinguishing steel billets: when changing steel grades, distinguishing steel billets of different heats by placing two refractory bricks or leaving two positions blank on a continuous-casting steel billet;

3.2. controlling a temperature of a heating furnace: for steel billets with different sizes, controlling a temperature of each section of a heating furnace as well as in-furnace time of the steel billet;

3.3. controlling a temperature in rolling process: setting an initial rolling temperature, a finishing mill entry temperature, and a cooling bed entry temperature, respectively;

wherein for steel billets with different sizes, controlling a temperature of each section of a heating furnace as well as in-furnace time of the steel billet specifically comprises the following steps:

for a steel billet with a cross section of 230 mm×230 mm, during hot charging, controlling a temperature at a first heating section to be less than or equal to 1,060° C., a temperature at a second heating section to be 1,210° C.-1,250° C., a temperature at a third heating section to be 1,260° C.-1,310° C., a temperature at a soaking section to be 1,250° C.-1,300° C., and the in-furnace time to be 150 min-180 min; during cold charging, controlling the temperature at the first heating section to be less than or equal to 1,100° C., the temperature at the second heating section to be 1,210° C.-1,260° C., the temperature at the third heating section to be 1,260° C.-1,310° C., the temperature at the soaking section to be 1,250° C.-1,315° C., and the in-furnace time to be 150 min-210 min;

for a steel billet with a cross section of 320 mm×410 mm, during hot charging, controlling the temperature at the first heating section to be less than or equal to 1,060° C., the temperature at the second heating section to be 1,210° C.-1,250° C., the temperature at the third heating section to be 1,260° C.-1,300° C., the temperature at the soaking section to be 1,250° C.-1,300° C., and the in-furnace time to be 150 min-180 min; during cold charging, controlling the temperature at the first heating section to be less than or equal to 1,100° C., the temperature at the second heating section to be 1,210° C.-1,260° C., the temperature at the third heating section to be 1,260° C.-1,310° C., the temperature at the soaking section to be 1,250° C.-1,315° C., and the in-furnace time to be 150 min-210 min;

setting an initial rolling temperature, a finishing mill entry temperature and a cooling bed entry temperature respectively comprises the following steps:

for a hot-charged steel billet, setting the initial rolling temperature to be 1,150+/−30° C., the finishing mill entry temperature to be 1,000° C.-1,090° C., and the cooling bed entry temperature to be 800° C.-950° C.;

for a cold-charged steel billet, setting the initial rolling temperature to be 1,150+/−40° C., the finishing mill entry temperature to be 1,000° C.-1,090° C., and the cooling bed entry temperature to be 800° C.-950° C.; and descaling operation: during descaling, controlling a water pressure to be greater than 19 MPa and a running speed of the steel billet to be 1.0 m/s to ensure to remove an oxidized scale from the surface of the steel billet.

\* \* \* \* \*